(12) United States Patent
Kanamori et al.

(10) Patent No.: US 8,643,301 B2
(45) Date of Patent: Feb. 4, 2014

(54) LED DRIVER CIRCUIT AND LED LIGHTING DEVICE USING THE SAME

(75) Inventors: Atsushi Kanamori, Osaka (JP); Takayuki Shimizu, Osaka (JP); Hirohisa Warita, Osaka (JP); Hiroyuki Shoji, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 210 days.

(21) Appl. No.: 13/198,929

(22) Filed: Aug. 5, 2011

(65) Prior Publication Data
US 2012/0043902 A1 Feb. 23, 2012

(30) Foreign Application Priority Data

Aug. 23, 2010 (JP) ................................. 2010-186208
Jun. 3, 2011 (JP) ................................. 2011-125274

(51) Int. Cl.
*G05F 1/00* (2006.01)
*H05B 39/04* (2006.01)

(52) U.S. Cl.
USPC ......................................... 315/291; 315/308

(58) Field of Classification Search
USPC ......... 315/291, 292, 293, 295, 297, 307–308, 315/224, 314–316, DIG. 4
See application file for complete search history.

(56) References Cited

U.S. PATENT DOCUMENTS

| | | | | |
|---|---|---|---|---|
| 5,604,411 | A * | 2/1997 | Venkitasubrahmanian et al. | 315/307 |
| 6,977,472 | B2 * | 12/2005 | Matsubayashi et al. | 315/291 |
| 7,061,191 | B2 * | 6/2006 | Chitta | 315/307 |
| 7,586,267 | B2 * | 9/2009 | Po | 315/224 |
| 7,759,881 | B1 * | 7/2010 | Melanson | 315/307 |
| 2010/0134038 | A1 * | 6/2010 | Shackle et al. | 315/291 |

FOREIGN PATENT DOCUMENTS

| | | |
|---|---|---|
| JP | 2004-327152 A | 11/2004 |
| JP | 2005-026142 A | 1/2005 |
| JP | 2006-210836 A | 8/2006 |
| JP | 2010-093874 A | 4/2010 |

* cited by examiner

*Primary Examiner* — Minh D A
(74) *Attorney, Agent, or Firm* — Birch, Stewart, Kolasch & Birch, LLP

(57) ABSTRACT

Provided is an LED driver circuit, to be connected to an AC power supply via a phase-control dimmer, for driving an LED load, including: a switching power supply part including a switching element and a switching current detection part; an LED current detection part; a first control part for controlling and switching the switching element so that a switching current has a desired current value based on a detection signal of the switching current detection part; a second control part for controlling and switching the switching element so that an LED current has a desired current value based on a detection signal of the LED current detection part; and a switch part for switching between control performed by the first control part when the phase-control dimmer is set to high brightness dimming and control performed by the second control part when the phase-control dimmer is set to low brightness dimming.

16 Claims, 22 Drawing Sheets

PHASE ANGLE DETECTOR

LED DRIVER CIRCUIT AND LED LIGHTING DEVICE USING THE SAME

This application is based on Japanese Patent Application No. 2010-186208 filed on Aug. 23, 2010 and Japanese Patent Application No. 2011-125274 filed on Jun. 3, 2011, the contents of which are hereby incorporated by reference.

BACKGROUND OF THE INVENTION

1. Field of the Invention

The present invention relates to an LED driver circuit and an LED lighting device using the same.

2. Description of Related Art

Light emitting diodes (LEDs) have features of low current consumption and long service life, expanding their applications not only in display devices but also in lighting fixtures. Most LED lighting fixtures use a plurality of LEDs in order to obtain desired illuminance (see, for example, Japanese Patent Application Laid-open Nos. 2004-327152, 2006-210836, and 2010-93874).

Most ordinary lighting fixtures use a commercial power supply of AC 100 V. Taking into consideration the use of an LED lighting device in place of an ordinary lighting device such as an incandescent light bulb, the LED lighting device is also desired to be configured to use the commercial power supply of AC 100 V similarly to the ordinary lighting device.

Further, dimming of an incandescent light bulb is controlled using a phase-control dimmer (generally called incandescent lighting controller), which is capable of dimming control on power supply to the incandescent light bulb with ease by using a single volume element for turning ON a switching element (typified by a thyristor element or a triac element) at a given phase angle of an AC power supply voltage (see, for example, Japanese Patent Application Laid-open No. 2005-26142). It is known that, even if the phase-control dimmer is used to control the dimming of the incandescent light bulb, flickering or flashing occurs when a low-watt incandescent light bulb is connected to the dimmer, and the dimming cannot be controlled normally.

For dimming control of an LED lighting device using an AC power supply, the phase-control dimmer is desired to be used similarly to the case of dimming control of the incandescent light bulb. Now, FIG. 20 illustrates a conventional example of an LED lighting system capable of dimming control of an LED lighting device using an AC power supply.

The LED lighting system illustrated in FIG. 20 includes a phase-control dimmer 200, an LED driver circuit 300, and an LED load 400 constituted by a plurality of LEDs. When a knob (not shown) of a preset variable resistor Rvar is set to a given position, the phase-control dimmer 200, which is connected to a commercial power supply 100, turns ON a triac Tri at a power supply phase angle corresponding to the set position of the knob. In addition, the phase-control dimmer 200 includes an anti-noise circuit formed of a capacitor C1 and an inductor L1, and the anti-noise circuit reduces terminal noise which is otherwise fed back to a power supply line from the phase-control dimmer 200.

Further, the LED driver circuit 300 includes a full-wave rectifier 1, a switching control circuit 2, and a switching power supply part 3. The switching power supply part 3 includes a switching element SW1, an inductor L2, a diode D1, a capacitor C4, and a current detection resistor R2. The switching control circuit 2 detects a current value flowing through the current detection resistor R2 connected to a source of the switching element SW1, and controls ON/OFF of the switching element SW1, to thereby control the current flowing through the switching element SW1 to be constant.

In this case, when a maximum value of the current flowing through the switching element SW1 is represented by ip, electric power supplied to the LED load 400, the inductor L2, the diode D1, and the capacitor C4 is $0.5 \times L \times ip^2 \times fo$ (where L is an inductance of the inductor and fo is a switching frequency (e.g., 60 kHz)). It is desired for the LED driver circuit 300 that a current of the LED load 400 be constant. However, the current supplied to the LED load 400 is not constant because of manufacturing fluctuations or temperature fluctuations about control on the inductor L2, the diode D1, the capacitor C4, and the values of ip and fo, resulting in that brightness of the LED load 400 itself is affected by the above-mentioned manufacturing fluctuations or temperature fluctuations. Although fluctuations in brightness of the LED load 400 in a bright state of high brightness are not perceived as a large change to the human eyes, the fluctuations are not negligible when the LED load 400 is in a dark state of low brightness.

In view of the above, conventionally, there is known an LED driver circuit of a type that controls an LED current to be constant (e.g., Japanese Patent Application Laid-open Nos. 2004-327152 and 2010-93874). Such LED driver circuit can stabilize brightness of an LED in a wide dimming range. However, in the type that controls the LED current to be constant, output electric power is made constant in the entire range in which an output voltage of the full-wave rectifier changes, to which an AC voltage with the phase controlled by the dimmer is input. Therefore, as illustrated in FIG. 21, at a timing t1 at which an instantaneous value of the output voltage of the full-wave rectifier becomes high, an input current is reduced to fall below a lower limit of a holding current of current holding means (e.g., triac) provided inside the dimmer, and then the current holding means is turned OFF. Accordingly, there has been a problem that the dimmer may malfunction with high possibility.

SUMMARY OF THE INVENTION

The present invention has an object to provide an LED driver circuit capable of suppressing a malfunction of a dimmer caused by a reduction in holding current while achieving a good brightness state in a wide dimming range, and also provide an LED lighting device using the LED driver circuit.

An LED driver circuit according to the present invention is an LED driver circuit, to be connected to an AC power supply via a phase-control dimmer, for driving an LED load, the LED driver circuit including: a switching power supply part including a switching element and a switching current detection part; an LED current detection part; a first control part for controlling and switching the switching element so that a switching current has a desired current value based on a detection signal of the switching current detection part; a second control part for controlling and switching the switching element so that an LED current has a desired current value based on a detection signal of the LED current detection part; and a switch part for switching between control performed by the first control part when the phase-control dimmer is set to high brightness dimming and control performed by the second control part when the phase-control dimmer is set to low brightness dimming (first configuration).

According to such configuration, in the case of low brightness dimming setting in which a change in brightness is easy to perceive and high accuracy of an LED current is required, the control is performed by the second control part so that the LED current may have a desired current value, and in the case of high brightness dimming setting in which the change in brightness is less conspicuous and the accuracy of the LED current is less needed, the control is performed by the first control part so that the switching current may have a desired current value, to thereby give priority to suppressing the reduction in holding current. This configuration obtains a good brightness state in a wide dimming range and suppresses a malfunction of the dimmer caused by the reduction in holding current.

Further, in the above-mentioned first configuration, the switch part may switch the control by outputting, to the switching element, one of control signals input from the first control part and the second control part, which has a shorter pulse width (second configuration).

Further, in the above-mentioned first configuration or the above-mentioned second configuration, the first control part may include: a comparator part for comparing a first reference voltage and the detection signal of the switching current detection part; an oscillator; and a latch circuit for outputting a pulsed control signal based on a comparison result of the comparator part and an output of the oscillator (third configuration).

Further, in the above-mentioned third configuration, the first control part may further include a voltage clamping part for clamping the first reference voltage (fourth configuration).

Further, in the above-mentioned third configuration or the above-mentioned fourth configuration, the first reference voltage may be a voltage obtained by dividing an input power supply voltage by resistors (fifth configuration).

Further, in any one of the above-mentioned first to fifth configurations, the second control part may include: a comparator part for comparing a second reference voltage and the detection signal of the LED current detection part; an oscillator; and another comparator part for outputting a pulsed control signal based on a comparison result of the comparator part and an output of the oscillator (sixth configuration).

Further, in any one of the above-mentioned first to fifth configurations, the second control part may include: a comparator part for comparing a second reference voltage and the detection signal of the LED current detection part; another comparator part for comparing a comparison result of the comparison part and a switching current detection signal; an oscillator; and a latch circuit for outputting a pulsed-control signal based on a comparison result of the another comparator part and an output of the oscillator (seventh configuration).

Further, in the above-mentioned seventh configuration, the switching current detection signal may be the detection signal of the switching current detection part (eighth configuration).

Further, in any one of the above-mentioned sixth to eighth configurations, the second reference voltage may be a detection signal of a phase angle detection part for detecting a phase angle of an input power supply voltage (ninth configuration).

Further, in the above-mentioned ninth configuration, the phase angle detection part may discharge a capacitor by a discharge amount corresponding to a time period required for the input power supply voltage to rise from 0 V, and output a terminal voltage of the discharged capacitor as a detection signal (tenth configuration).

Further, in the above-mentioned ninth configuration, the phase angle detection part may be constituted by a low pass filter, and output a detection signal obtained by averaging the input power supply voltages (eleventh configuration).

Further, in any one of the above-mentioned ninth to eleventh configurations, an output of the LED current detection part may have an offset added thereto (twelfth configuration).

Further, in any one of the above-mentioned ninth to eleventh configurations, an output of the phase angle detection part may have an offset added thereto (thirteenth configuration).

Further, in any one of the first to thirteenth configurations, the switching power supply part may be constituted by a boost converter or a buck converter (fourteenth configuration).

Further, in any one of the first to fourteenth configurations, the switching power supply part may be constituted by an isolated converter including a transformer (fifteenth configuration).

Further, an LED lighting device according to the present invention includes: the LED driver circuit having any one of the first to fifteenth configurations; and an LED load, which is driven by the LED driver circuit.

DETAILED DESCRIPTION OF PREFERRED EMBODIMENT

Figure 1:
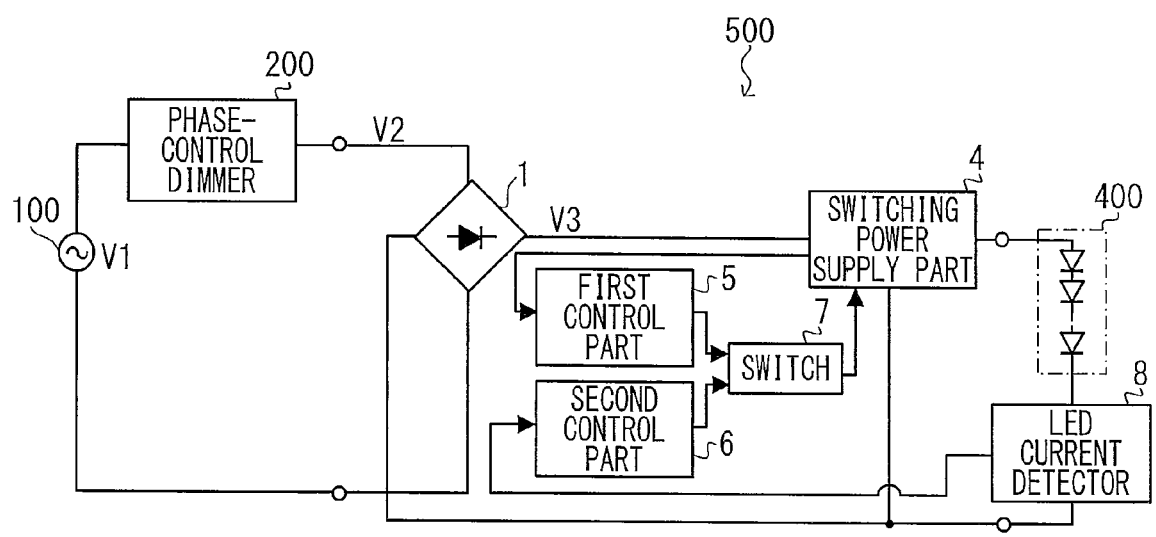
FIG. 1 is a diagram illustrating a configuration example of an LED driver circuit according to an embodiment mode of the present invention.

Hereinafter, an embodiment mode of the present invention is described with reference to the accompanying drawings. FIG. 1 illustrates a configuration of an LED driver circuit according to the embodiment mode of the present invention.

Referring to FIG. 1, an LED driver circuit 500 is a circuit for driving an LED load 400, and includes a full-wave rectifier 1, a switching power supply part 4, a first control part 5, a second control part 6, a switch 7, and an LED current detector 8. The first control part 5 outputs, based on an output of a switching current detector (not shown) included in the switching power supply part 4, a control signal corresponding to input power (output of the full-wave rectifier 1) to a switching element (not shown) included in the switching power supply part 4 to control ON/OFF of the switching element, to thereby control a switching current to a desired current value. Further, the second control part 6 outputs, based on an output of the LED current detector 8, a control signal corresponding to the input power to the switching element included in the switching power supply part 4 to control ON/OFF of the switching element, to thereby control an LED current to a desired current value. Then, the switch 7 outputs the control signal of the first control part 5 to the switching power supply part 4 when a phase-control dimmer 200 is set to high brightness, and outputs the control signal of the second control part 6 to the switching power supply part 4 when the phase-control dimmer 200 is set to low brightness.

Figure 2:
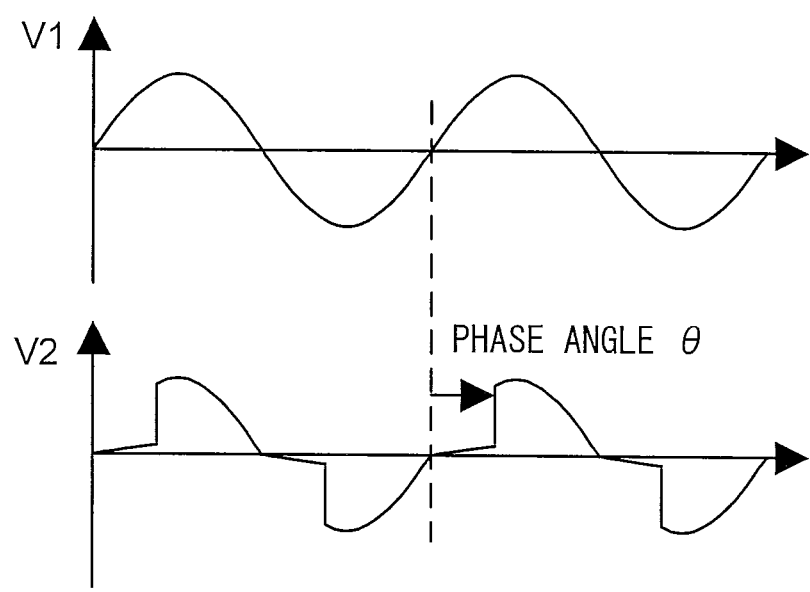
FIG. 2 is a timing chart related to phase-controlled dimming
Figure 3:
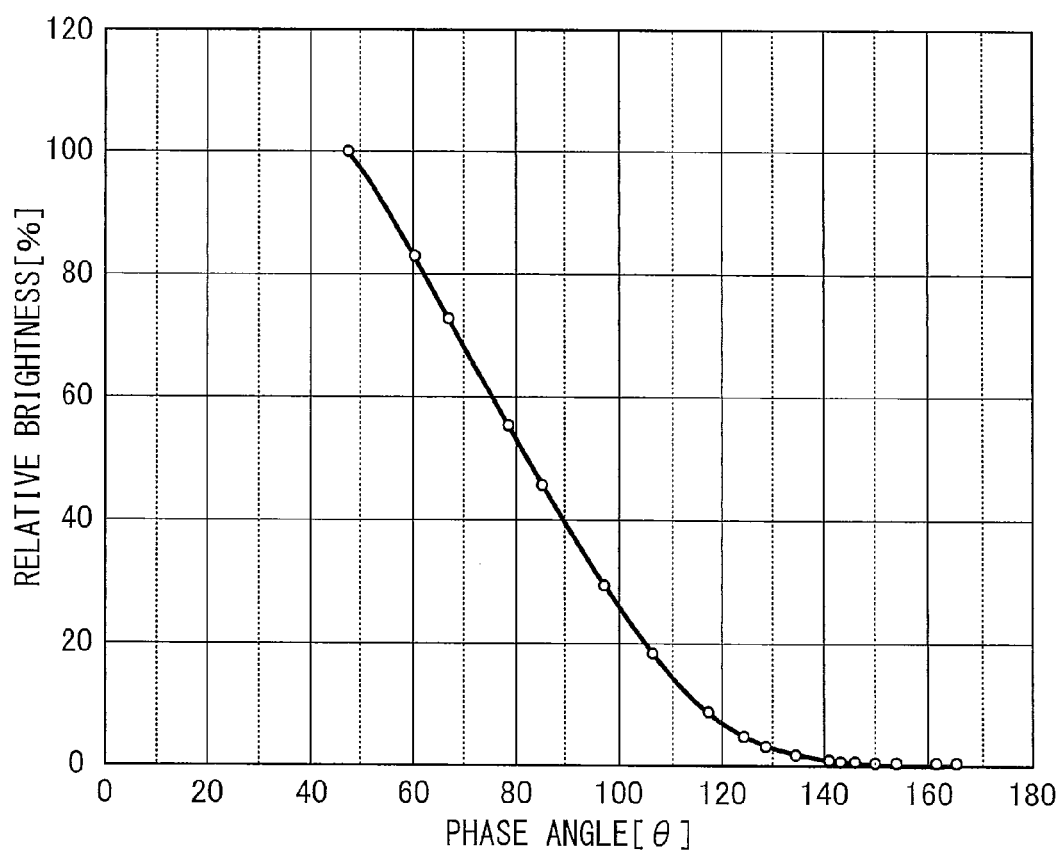
FIG. 3 is a graph illustrating an example of a relationship between a relative brightness and a phase angle when an incandescent light bulb is connected to a dimmer.

FIG. 2 illustrates a timing chart related to phase-controlled dimming. In FIG. 2, the upper side is a waveform of an AC voltage V1 (FIG. 1) and the lower side is a waveform of an output voltage V2 (FIG. 1) of the phase-control dimmer 200. In the output voltage V2 of the phase-control dimmer 200, a period from a timing of 0 V to a timing of voltage rising is defined as a phase angle θ, and the phase angle indicates the degree of dimming. FIG. 3 illustrates a relationship between a relative brightness and the phase angle when an incandescent light bulb is connected to a dimmer. It can be seen from FIG. 3 that the phase angle is changed by the dimmer from 47° to 164° and the relative brightness is changed correspondingly.

In the embodiment mode of the present invention, the high brightness refers to a dimmed state in which the phase angle is less than 120° and the low brightness refers to a dimmed state in which the phase angle is 120° or more, for example. Note that, it is desired that a phase angle at the border between the high brightness and the low brightness be 90° or more. The switch 7 may be, for example, a switch for switching between the control signal of the first control part 5 and the control signal of the second control part 6 according to an output of a phase angle detector (not shown in FIG. 1) and outputting the switched control signal (the phase angle detector is described later). For example, if the phase angle at the border is set to 120°, the control signal of the first control part 5 is output when the output of the phase angle detector is less than 120°, while the control signal of the second control part 6 is output when the output of the phase angle detector is 120° or more.

Figure 4A:
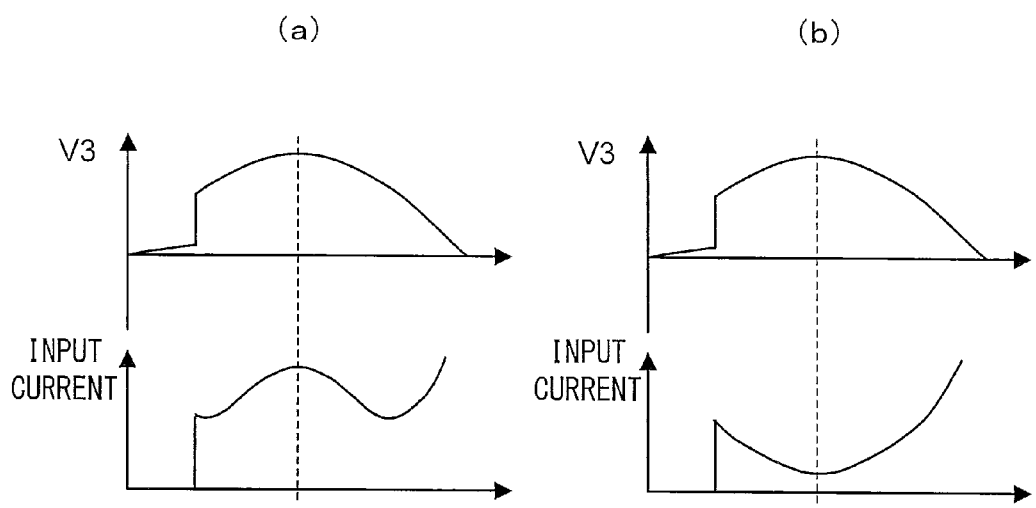
FIG. 4A is timing charts related to a comparison between current constant controls performed by a first control part and a second control part.

FIG. 4A illustrates timing charts related to a comparison between the control performed by the first control part 5 and the control performed by the second control part 6. In the example of FIG. 4A, the switching current is controlled to be constant by the first control part 5 and the LED current is controlled to be constant by the second control part 6. This configuration has an advantage in simplifying the configuration. Part (a) of FIG. 4A illustrates an input current (average value) under control of the first control part 5 in comparison with an input power supply voltage V3 as the output of the full-wave rectifier 1. Part (b) of FIG. 4A illustrates an input current (average value) under control of the second control part 6 in comparison with the output voltage V3 of the full-wave rectifier 1. Under control of the second control part 6, the LED current is constant, and accordingly output electric power is constant in the entire range in which the voltage V3 changes. Therefore, at a timing at which an instantaneous value of the voltage V3 is high, the input current is reduced (part (b) of FIG. 4A) to fall below a lower limit of a holding current of current holding means provided inside the dimmer, and the current holding means is turned OFF. Accordingly, the dimmer may malfunction. Under control of the first control part 5, on the other hand, the input current is not reduced even when the instantaneous value of the input power supply voltage V3 becomes maximum (part (a) of FIG. 4A), and accordingly the holding current can be maintained.

Therefore, in the case where the dimmer is set to high brightness, the control is performed by the first control part 5 so as to maintain the holding current and suppress a malfunction of the dimmer. Even if the LED current changes to change the brightness, no problem occurs to the human eyes because of the high brightness state. Besides, in the case where the dimmer is set to low brightness, the control is performed by the second control part 6 so as to precisely control the LED current to be a constant current value, to thereby stabilize the brightness in the low brightness state, in which the change in brightness is easy to perceive.

Figure 4B:
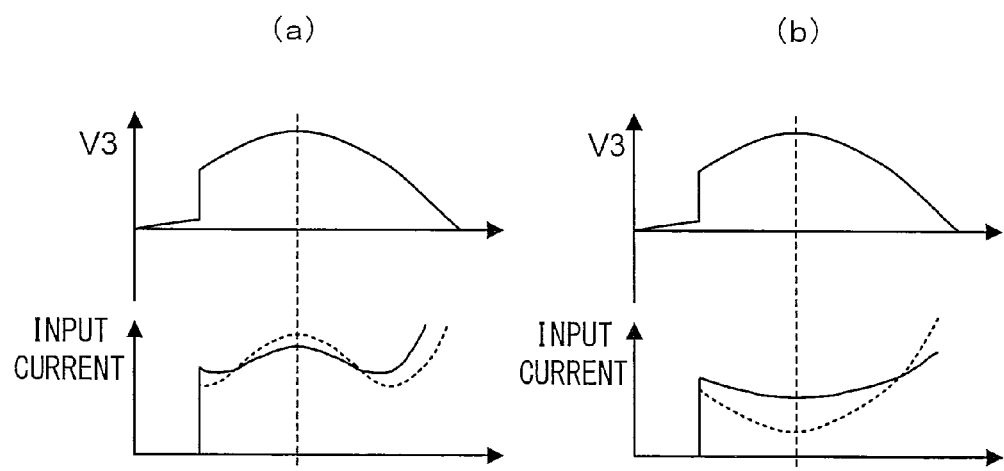
FIG. 4B is timing charts related to a comparison between current variable controls performed by the first control part and the second control part.

As another embodiment, part (a) of FIG. 4B illustrates an example in which the first control part 5 provides the switching current with an inverse correlation to the input power supply voltage V3 (the broken line of part (a) of FIG. 4B indicates the same input current waveform of part (a) of FIG. 4A). The configuration of the first control part 5 to raise the switching current as the input power supply voltage V3 reduces can prevent the input current from being reduced when the input power supply voltage V3 is low. The configuration is therefore particularly suitable for low power LED lighting with a small input current.

As still another embodiment, part (b) of FIG. 4B illustrates an example in which the second control part 6 provides the LED current with an inverse correlation to the input power supply voltage V3 (the broken line of part (b) of FIG. 4B indicates the same input current waveform of part (b) of FIG. 4A). The configuration of the second control part 6 to raise the LED current as the input power supply voltage V3 reduces can prevent the input current from being reduced when the input power supply voltage V3 is low. The configuration is therefore particularly suitable for low power LED lighting with a small input current.

Figure 5:
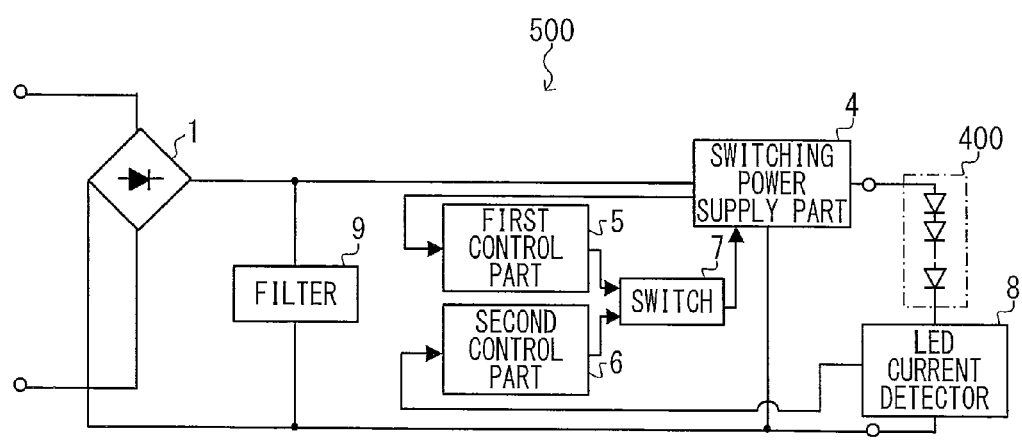
FIG. 5 is a diagram illustrating an example in which an input filter is provided in the LED driver circuit according to the embodiment mode of the present invention.

Note that, the holding current is generally approximately 10 mA to 30 mA, and the current holding means provided inside the dimmer has a slow response speed and hence, in some cases, the current holding means is not turned OFF even when the input current falls below the holding current for approximately 50 μs. For that reason, in order to ensure current holding, it is also effective, as illustrated in FIG. 5, to provide a filter 9 to the input of the switching power supply part 4 to average the input currents.

Figure 6:
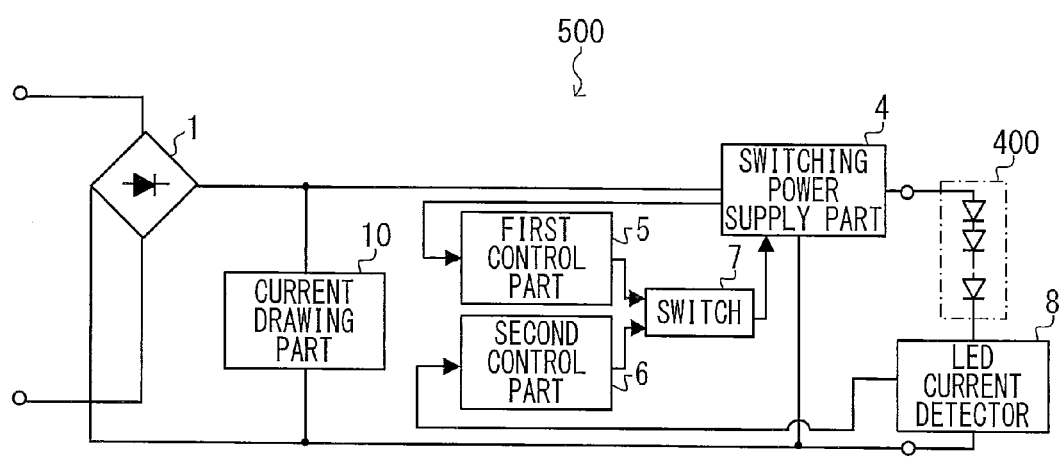
FIG. 6 is a diagram illustrating an example in which a current drawing part is provided in the LED driver circuit according to the embodiment mode of the present invention.

Further, as illustrated in FIG. 6, in order to operate the phase-control dimmer 200 normally, a current drawing part 10 may be provided to the input of the switching power supply part 4. This configuration can forcibly cause the holding current of the dimmer to flow to prevent the current holding means from being turned OFF.

Figure 7:
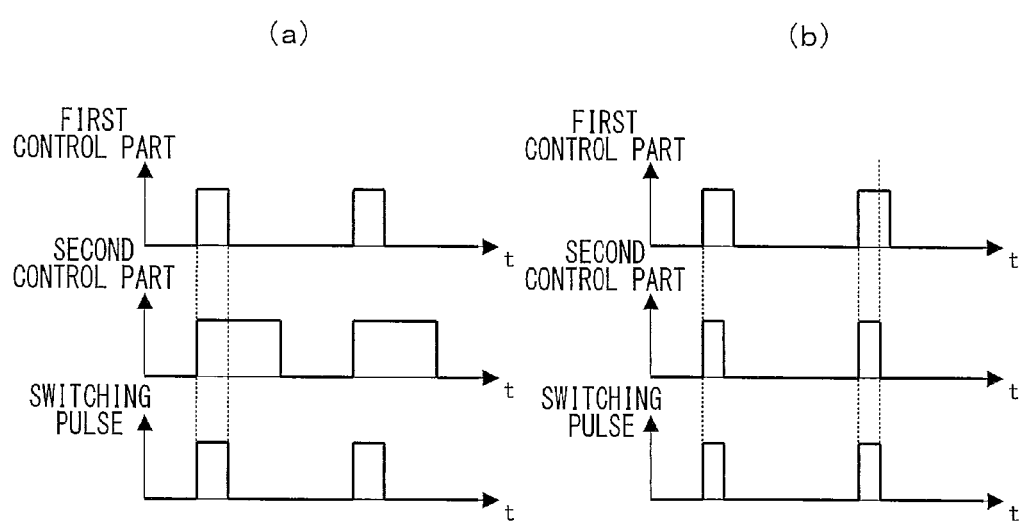
FIG. 7 is timing charts related to control switching corresponding to a pulse width of a control signal.

Further, the switching between the control signals can be performed by the switch 7 also in the following manner, without using the above-mentioned phase angle detector. Respective parameters of the first control part 5, the second control part 6, the switching power supply part 4, and the LED current detector 8 are set so that a pulse width of the control signal of the first control part 5 may be shorter than that of the second control part 6 when the phase-control dimmer 200 is set to high brightness (part (a) of FIG. 7) while a pulse width of the control signal of the second control part 6 may be shorter than that of the first control part 5 when the phase-control dimmer 200 is set to low brightness (part (b) of FIG. 7). Then, the switch 7 outputs one of the input control signals having a shorter pulse width (see parts (a) and (b) of FIG. 7). This configuration enables the control to be switched according to the brightness. In addition, the pulse width of the control signal output from the switch 7 changes continuously when the switching occurs, which can avoid abnormality that the brightness suddenly changes when the switching occurs.

Next, a specific configuration example of the first control part 5 is described.

Figure 8:
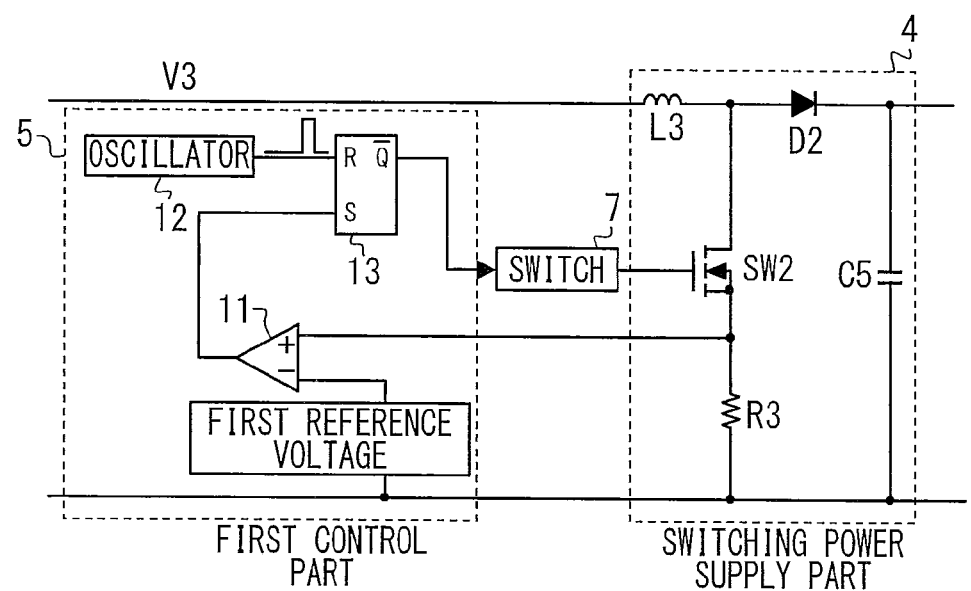
FIG. 8 is a diagram illustrating a first configuration example of the first control part.

FIG. 8 illustrates a first configuration example of the first control part 5. The switching power supply part 4 is constituted as a boost converter, in which a resistor R3 as the switching current detector is connected between a switching element SW2 and a reference voltage line. The first control part 5 includes a comparator 11, an oscillator 12, and an RS flip flop 13 as a latch circuit. Then, a voltage obtained by converting the switching current by the resistor R3 is input to a non-inverting terminal of the comparator 11, and a first reference voltage is input to an inverting terminal thereof. An output of the comparator 11 is input to a set terminal of the RS flip flop 13. Further, an output of the oscillator 12, which generates a pulse, is input to a reset terminal of the RS flip flop 13. An output from a Q-bar output terminal of the RS flip flop 13 is input to the switch 7. With this configuration, a signal for turning ON the switching element SW2 is output as the output of the oscillator 12, while a signal for turning OFF the switching element SW2 is output as the output of the comparator 11. The use of the latch circuit as exemplified by the RS flip flop 13 can avoid a loop of an erroneous operation, such as current detection→turning OFF the switching element→current non-detection→turning ON the switching element→current detection→. . . .

Figure 9:
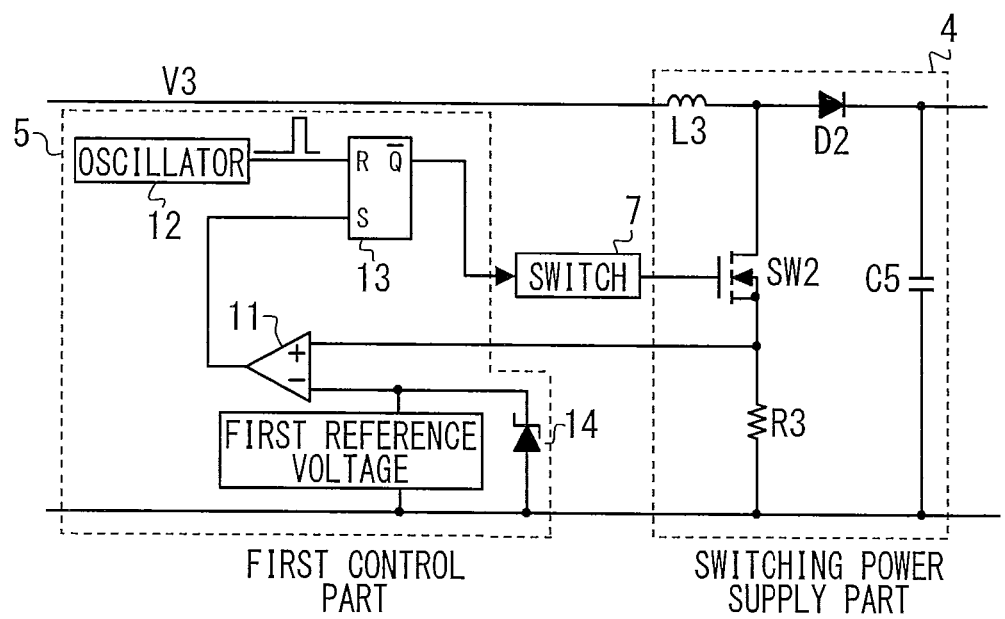
FIG. 9 is a diagram illustrating a second configuration example of the first control part.

FIG. 9 illustrates a second configuration example of the first control part 5. In this configuration, a Zener diode 14 as voltage clamping means is added in parallel to the first reference voltage source in the above-mentioned first configuration example (FIG. 8). Even if the first reference voltage is increased abnormally, a current flows through the Zener diode 14 and hence the first reference voltage is clamped to a predetermined value. This way, prevention of breakage of an element caused by abnormality of the first reference voltage can be achieved by a simple configuration, and accordingly the chip size can be reduced, leading to an advantage in cost.

Figure 10:
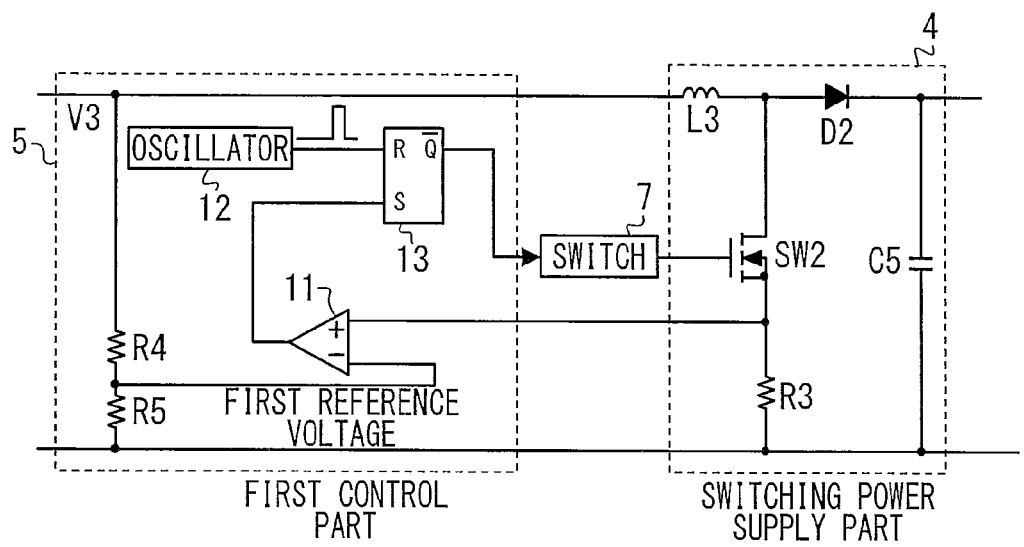
FIG. 10 is a diagram illustrating a specific example of the first configuration example of the first control part.

FIG. 10 illustrates a specific example of the above-mentioned first configuration example of the first control part 5. In this configuration example, in the above-mentioned first configuration example (FIG. 8), a voltage obtained by voltage division of resistors R4 and R5 connected in series between the input power supply line and the reference voltage line is input as the first reference voltage to the inverting terminal of the comparator 11. By generating the first reference voltage having a positive correlation to the input voltage, the power factor can be improved.

Next, a specific configuration example of the second control part 6 is described.

Figure 11:
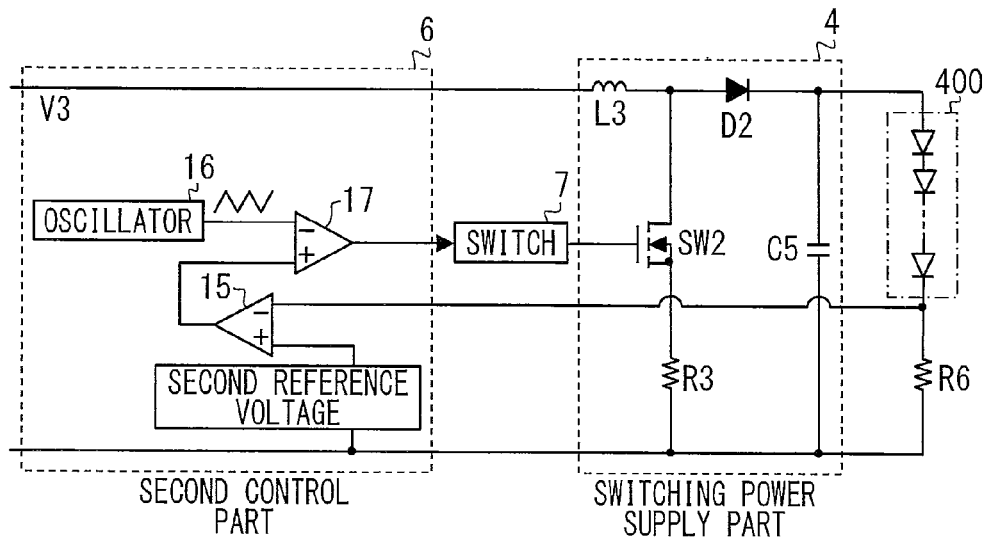
FIG. 11 is a diagram illustrating a first configuration example of the second control part.

FIG. 11 illustrates a first configuration example of the second control part 6. The second control part 6 includes an error amplifier 15, an oscillator 16, and a comparator 17. A voltage obtained by converting an LED current by the resistor R6 serving as the LED current detector 8 is input to an inverting terminal of the error amplifier 15, and a second reference voltage is input to a non-inverting terminal of the error amplifier 15. Then, an output of the error amplifier 15 is input to a non-inverting terminal of the comparator 17, and an output of the oscillator 16, which generates a triangle wave, is input to an inverting terminal of the comparator 17. An output of the comparator 17 is input to the switch 7. When the amount of the LED current is small, the output of the error amplifier 15 is large, and a pulse width of a pulse output from the comparator 17 is wide. This scheme can reduce the pulse width of the control signal and is therefore effective for a high input voltage and a low output, such as a 200 V system input and a 4 W output, which requires a small pulse width.

Figure 12:
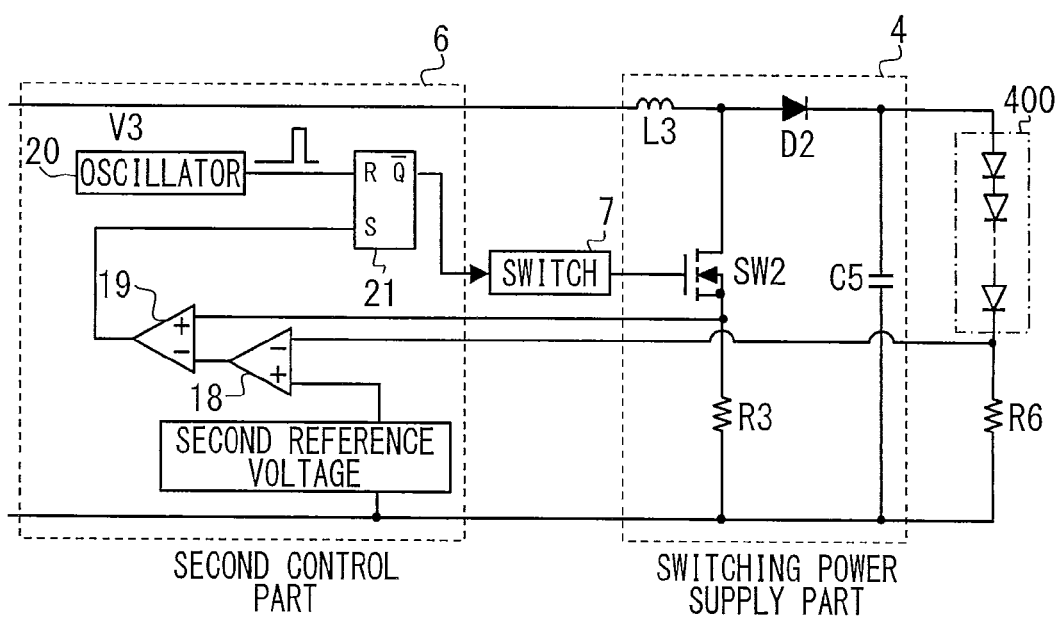
FIG. 12 is a diagram illustrating a second configuration example of the second control part.

FIG. 12 illustrates a second configuration example of the second control part 6. The second control part 6 includes an error amplifier 18, a comparator 19, an oscillator 20, and an RS flip flop 21. A voltage obtained by converting an LED current by the resistor R6 serving as the LED current detector 8 is input to an inverting terminal of the error amplifier 18, and a second reference voltage is input to a non-inverting terminal of the error amplifier 18. An output of the error amplifier 18 is input to an inverting terminal of the comparator 19. A voltage obtained by converting a switching current by the resistor R3 serving as the switching current detector is input to a non-inverting terminal of the comparator 19. Further, an output of the comparator 19 is input to a set terminal of the RS flip flop 21, and an output of the oscillator 20 (which is preferred to output a pulse with a small pulse width, rather than a triangle wave) is input to a reset terminal of the RS flip flop 21. Then, an output from a Q-bar output terminal of the RS flip flop 21 is input to the switch 7. An upper limit of the switching current flowing through the switching element SW2 is set based on the voltage generated across the resistor R6, the second reference voltage, and the error amplifier 18. When the current flowing through the switching element SW2 reaches the upper limit, the control signal for turning OFF the switching element SW2 is output as the output of the comparator 19, while the control signal for turning ON the switching element SW2 is output as the output of the oscillator 20. The configuration above is a control system generally called current control system. According to this system, a timing of turning ON the switching element is determined by the oscillator, and hence a noise-related malfunction less occurs, which is effective for the conditions of high power output of 20 W and the like with large noise. Besides, the resistor R3 serving as the switching current detector is shared between the first control part 5 and the second control part 6, which eliminates the need to add a circuit, thus achieving low cost.

Figure 13:
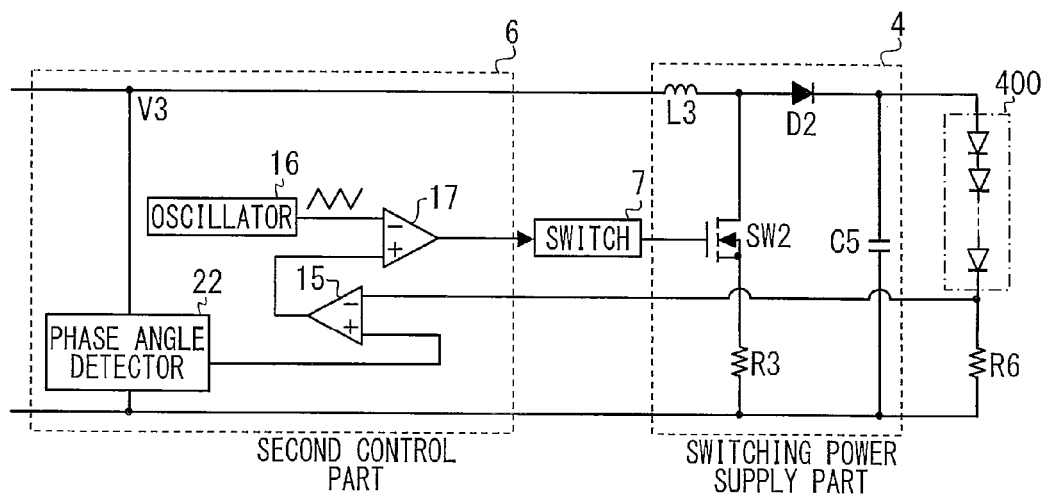
FIG. 13 is a diagram illustrating a specific example of the first configuration example of the second control part.

Further, FIG. 13 illustrates the case where a phase angle detector 22 is used as the second reference voltage source included in the second control part 6 of the above-mentioned first configuration example. The phase angle detector 22 detects a phase angle from the input power supply voltage V3 and outputs the detected signal as the second reference voltage.

Figure 14:
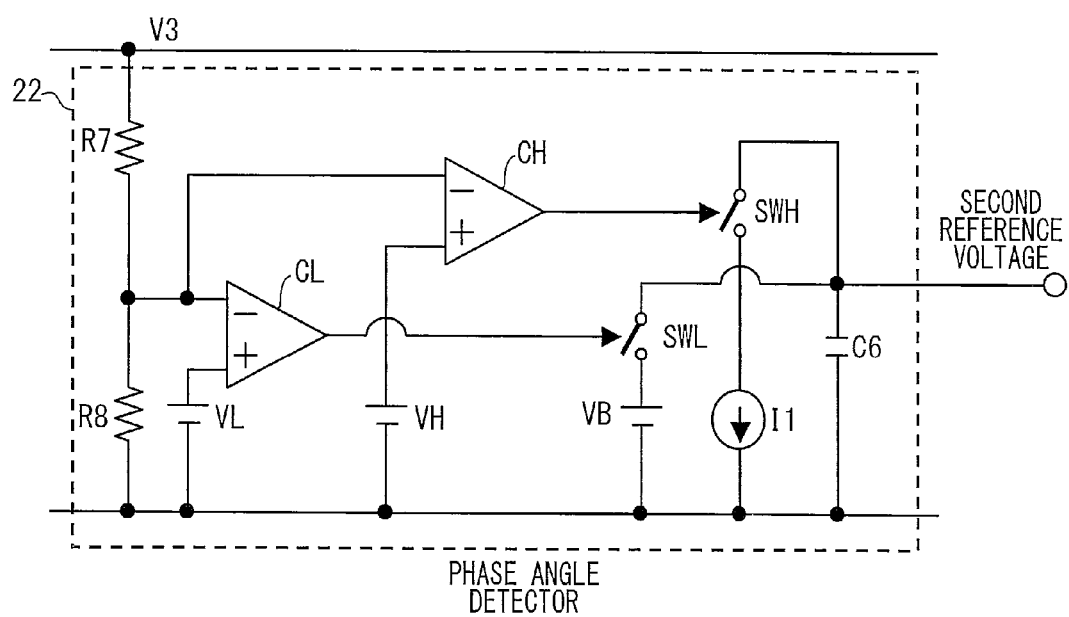
FIG. 14 is a diagram illustrating a first configuration example of a phase angle detector.

FIG. 14 illustrates a first configuration example of the phase angle detector 22. The phase angle detector 22 includes resistors R7 and R8, comparators CL and CH, switches SWL and SWH, a constant current source I1, and a capacitor C6. The resistor R7 and the resistor R8 are connected in series between the input power supply line and the reference voltage line. A voltage obtained by voltage division of the resistors R7 and R8 is input to an inverting terminal of the comparator CL, and a reference voltage VL is input to a non-inverting terminal of the comparator CL. An output of the comparator CL drives the switch SWL. Further, the voltage obtained by voltage division of the resistors R7 and R8 is input to an inverting terminal of the comparator CH, and a reference voltage VH (>VL) is input to a non-inverting terminal of the comparator CH. An output of the comparator CH drives the switch SWH. In addition, one end of the capacitor C6 is applied with a reference voltage VB via the switch SWL and also connected to the constant current source I1 via the switch SWH, and the second reference voltage is extracted from the one end of the capacitor C6.

In the above-mentioned configuration, when the voltage obtained by voltage division of the resistors R7 and R8 is equal to or lower than the reference voltage VL, the input power supply voltage V3 is regarded as 0 V. Accordingly, the switches SWL and SWH are turned ON, and the second reference voltage becomes the reference voltage VB to charge the capacitor C6. Then, when the voltage obtained by voltage division of the resistors R7 and R8 exceeds the reference voltage VL but is equal to or lower than the reference voltage VH, the input power supply voltage V3 is regarded as not having risen yet. Accordingly, the switch SWL is turned OFF and the switch SWH is turned ON so that the capacitor C6 is discharged by the constant current source I1. Then, when the voltage obtained by voltage division of the resistors R7 and R8 exceeds the reference voltage VH, the input power supply voltage V3 is regarded as having risen. Accordingly, the switches SWL and SWH are turned OFF to stop the discharge of the capacitor C6. Through the operation above, the second reference voltage corresponding to a time period required for the input power supply voltage V3 to rise from 0 V, that is, corresponding to a phase angle can be generated.

Figure 15:
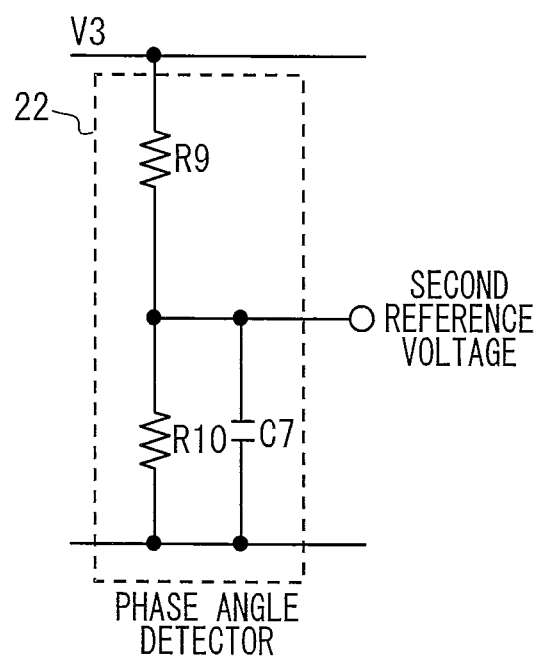
FIG. 15 is a diagram illustrating a second configuration example of the phase angle detector.

FIG. 15 illustrates a second configuration example of the phase angle detector 22. The phase angle detector 22 includes resistors R9 and R10 and a capacitor C7. The resistor R9 and the resistor R10 are connected in series between the input power supply line and the reference voltage line. One end of the capacitor C7 is connected to a connection point between the resistors R9 and R10, and another end thereof is connected to the reference voltage line. Then, the second reference voltage is extracted from the capacitor C7 on the side of the connection point between the resistors R9 and R10. The resistors and the capacitor together constitute a low pass filter, and the input power supply voltages V3 are averaged by the low pass filter to be output as the second reference voltage. It is desired that a cutoff frequency of the low pass filter be several Hz or lower, which is sufficiently lower than the commercial frequency (50 Hz or 60 Hz).

Figure 16:
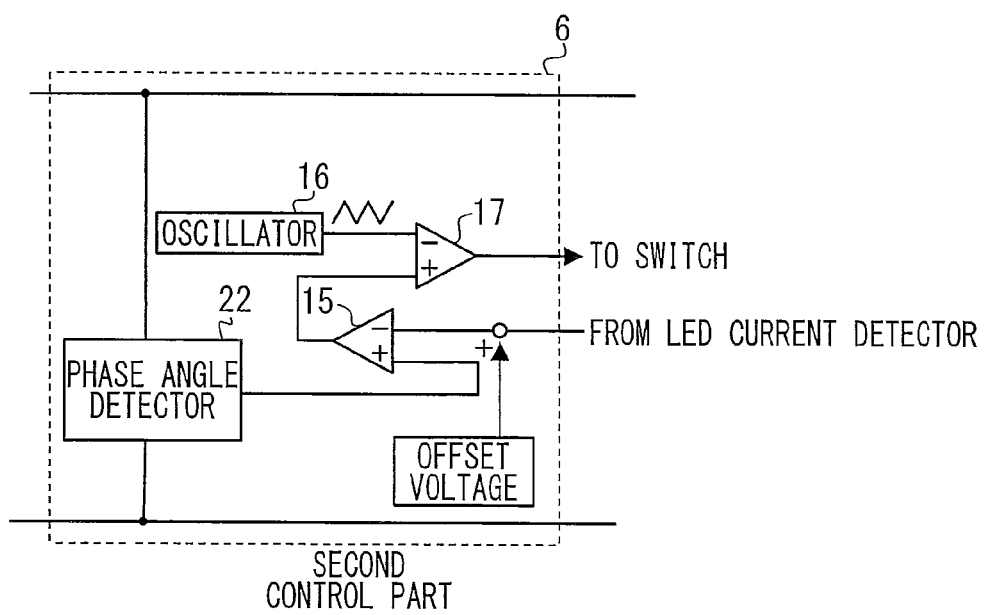
FIG. 16 is a diagram illustrating a modified example of the second control part illustrated in FIG. 13.

Further, FIG. 16 illustrates a modified example of the configuration of the second control part 6 illustrated in FIG. 13. In this configuration, an offset voltage is added to the output of the LED current detector (resistor R6). In some dimmers, even when the setting is made to a maximum phase angle, the output of the phase angle detector 22 does not become 0, which means that the configuration of FIG. 13 cannot control the LED current to 0. In view of this, in this configuration, an offset voltage higher than the output of the phase angle detector 22 under the setting of a maximum phase angle is added so that the LED current may be controlled to 0, that is, the LED load 400 may be turned OFF.

Figure 17:
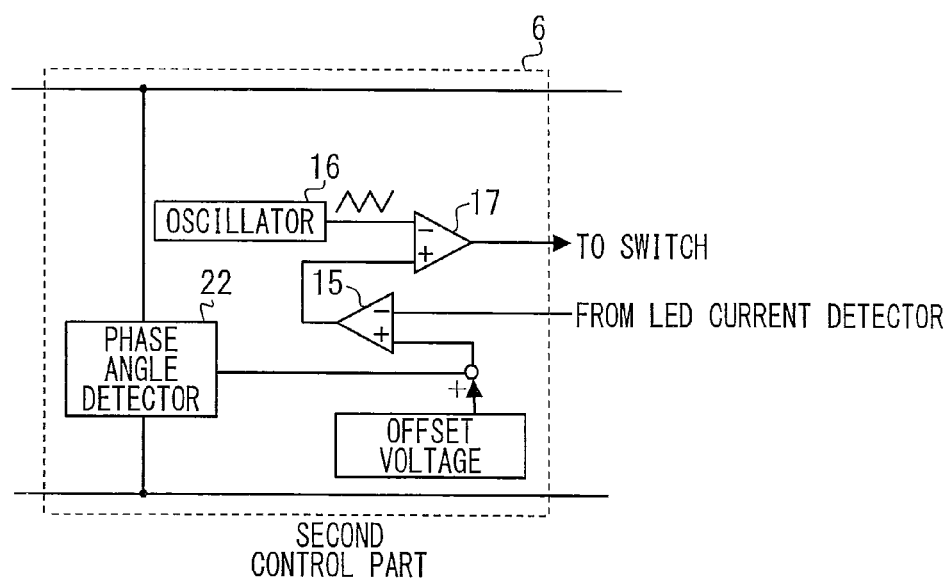
FIG. 17 is a diagram illustrating another modified example of the second control part illustrated in FIG. 13.

Further, in FIG. 17, an offset voltage is added to the output of the phase angle detector 22. In some dimmers, the output of the phase angle detector 22 becomes 0 under the setting to a maximum phase angle, and the LED current is controlled to 0 to turn OFF the LED load 400. In view of this, by adding the offset voltage to the output of the phase angle detector 22, it is possible to prevent the LED current from being 0 so that the LED load 400 may be slightly turned ON under the setting to a maximum phase angle.

Whether the LED current is set to 0 (OFF state) or not to 0 (slightly-ON state) under dimming to minimum brightness is an option for the designer to determine as appropriate. However, because the settable maximum phase angle is varied depending on the dimmer, in the configuration without providing an offset voltage, the LED load 400 may be turned OFF or slightly turned ON depending on the dimmer, resulting in an unintended operation for the designer. In view of this, by providing the offset voltage as described above, it is possible to realize the minimum brightness dimmed state intended by the designer.

Note that, for example, in the above-mentioned configuration illustrated in FIG. 8, the switching power supply part 4 is constituted by a boost converter, and hence the output of the LED current detector can be constituted by a low withstand voltage system (e.g., 5 V system), which can realize speed-up of an error amplifier to which the output of the LED current detector is input, and also realize a reduction in size thereof.

Figure 18:
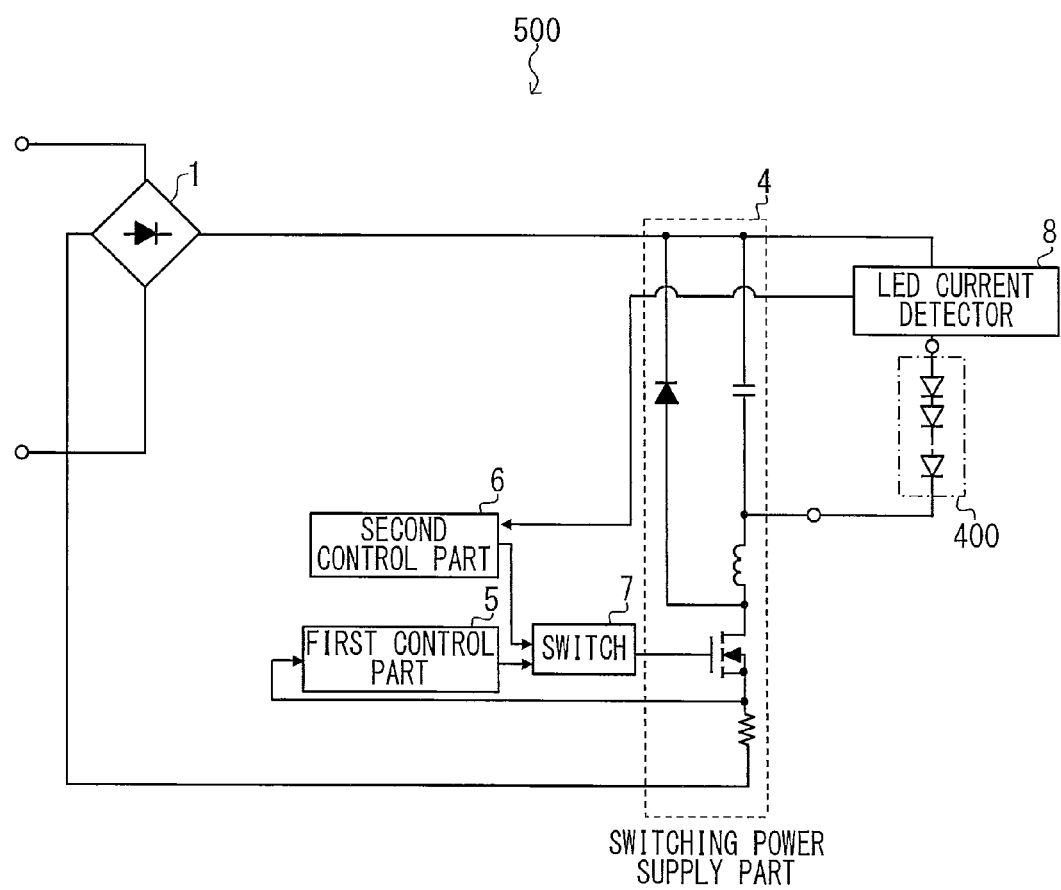
FIG. 18 is a diagram illustrating an example in which a switching power supply part is constituted by a buck converter.

On the other hand, in a configuration of FIG. 18, the switching power supply part 4 is constituted by a buck converter, and hence the voltage of the LED load 400 to be connected can be set to be low. For example, in the case of driving with an AC 100 V, the voltage of the LED load 400 is generally 24 V to 60 V.

Figure 19:
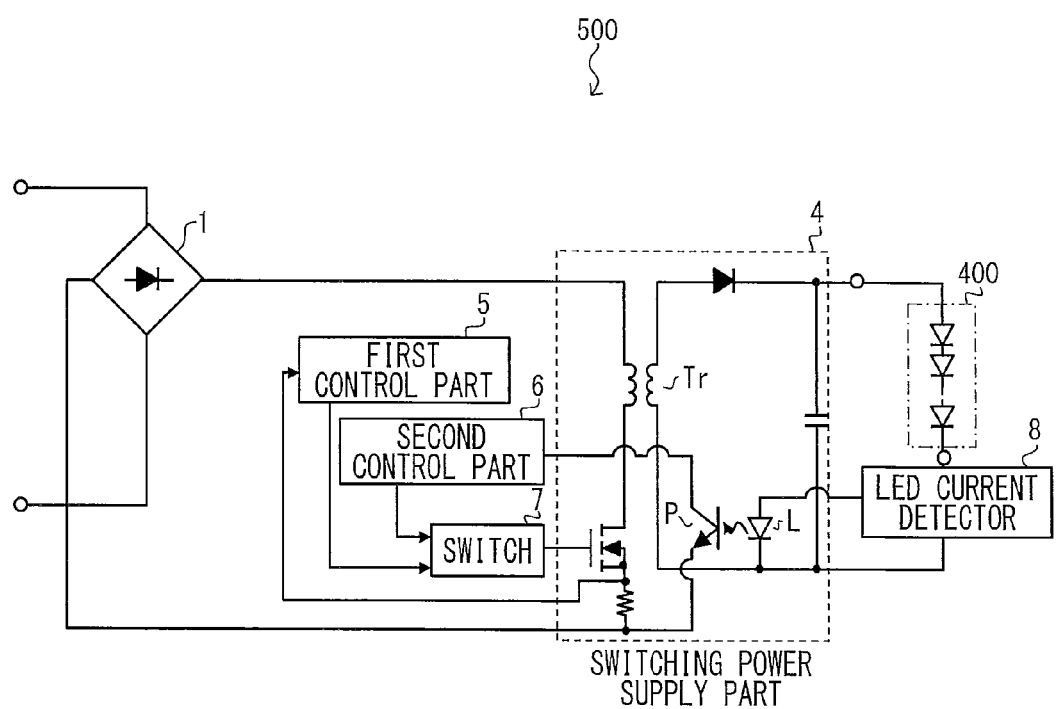
FIG. 19 is a diagram illustrating an example in which the switching power supply part is constituted by an isolated converter.
Figure 20:
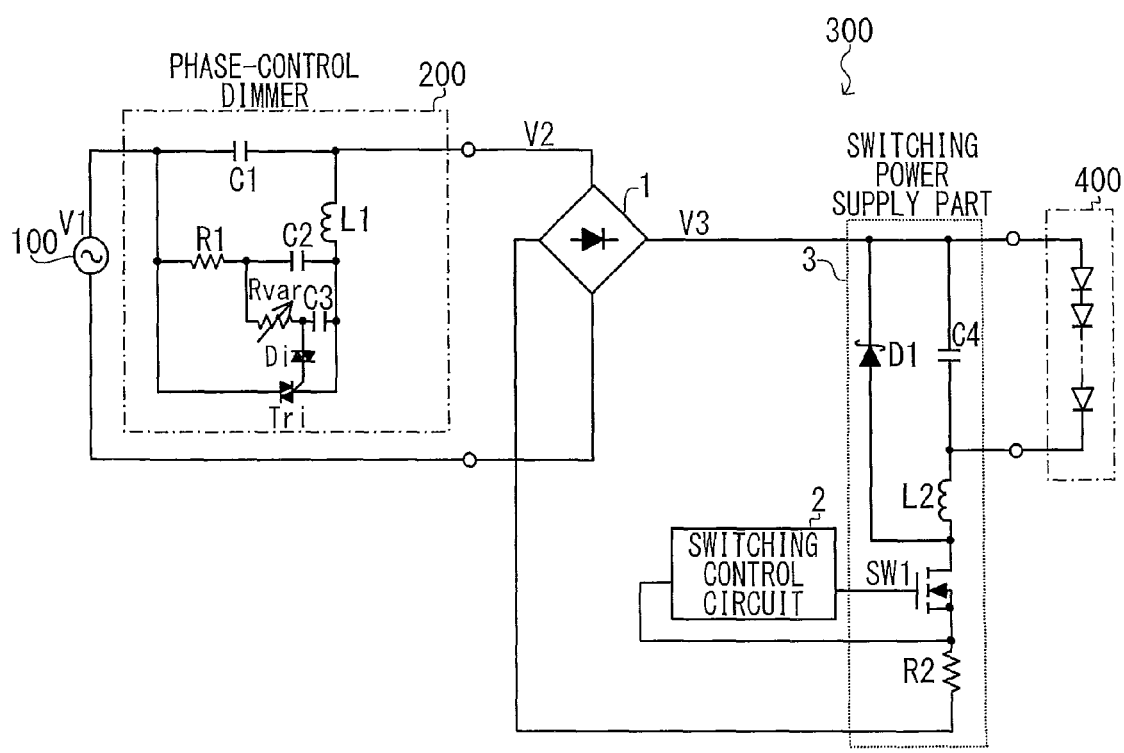
FIG. 20 is a diagram illustrating a conventional example of an LED lighting system.
Figure 21:
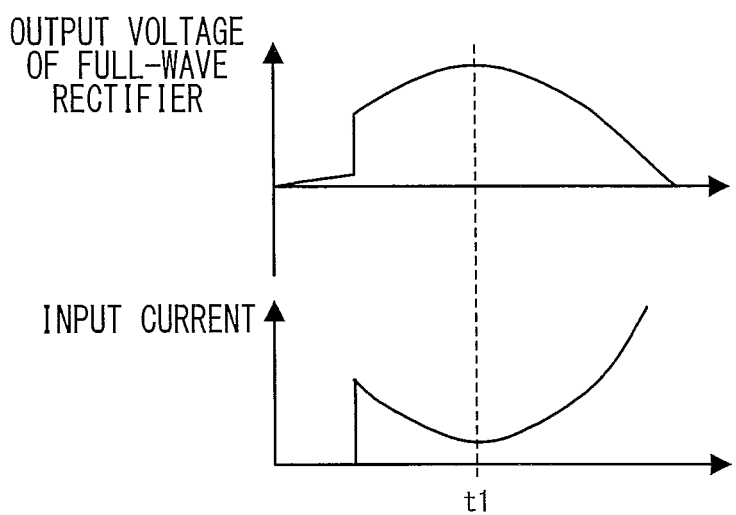
FIG. 21 is a timing chart when an LED current is controlled to be constant.

Further, in a configuration illustrated in FIG. 19, the switching power supply part 4 is constituted by an isolated converter using a transformer Tr, and the AC side and the LED side are isolated from each other, which is effective for the case where the potential on the LED side may be touched by a human. Note that, the output of the LED current detector 8 is input to the second control part 6 via a light emitting diode L and a phototransistor P.

The LED driver circuit according to the embodiment mode of the present invention has been described above. An example of the LED lighting device including the LED driver circuit according to the present invention and an LED load is an LED bulb.

What is claimed is:
1. An LED driver circuit, to be connected to an AC power supply via a phase-control dimmer, for driving an LED load, the LED driver circuit comprising:
   a switching power supply part including a switching element and a switching current detection part;
   an LED current detection part;
   a first control part for controlling and switching the switching element so that a switching current has a desired current value based on a detection signal of the switching current detection part;
   a second control part for controlling and switching the switching element so that an LED current has a desired current value based on a detection signal of the LED current detection part; and
   a switch part for switching between control performed by the first control part when the phase-control dimmer is set to high brightness dimming and control performed by the second control part when the phase-control dimmer is set to low brightness dimming.

2. An LED driver circuit according to claim 1, wherein the switch part switches the control by outputting, to the switching element, one of control signals input from the first control part and the second control part, which has a shorter pulse width.

3. An LED driver circuit according to claim 1, wherein the first control part comprises:
- a comparator part for comparing a first reference voltage and the detection signal of the switching current detection part;
- an oscillator; and
- a latch circuit for outputting a pulsed control signal based on a comparison result of the comparator part and an output of the oscillator.

4. An LED driver circuit according to claim 3, wherein the first control part further comprises a voltage clamping part for clamping the first reference voltage.

5. An LED driver circuit according to claim 3, wherein the first reference voltage comprises a voltage obtained by dividing an input power supply voltage by resistors.

6. An LED driver circuit according to claim 1, wherein the second control part comprises:
- a comparator part for comparing a second reference voltage and the detection signal of the LED current detection part;
- an oscillator; and
- another comparator part for outputting a pulsed control signal based on a comparison result of the comparator part and an output of the oscillator.

7. An LED driver circuit according to claim 6, wherein the second reference voltage comprises a detection signal of a phase angle detection part for detecting a phase angle of an input power supply voltage.

8. An LED driver circuit according to claim 7, wherein the phase angle detection part discharges a capacitor by a discharge amount corresponding to a time period required for the input power supply voltage to rise from 0 V, and outputs a terminal voltage of the discharged capacitor as a detection signal.

9. An LED driver circuit according to claim 7, wherein the phase angle detection part is constituted by a low pass filter, and outputs a detection signal obtained by averaging the input power supply voltages.

10. An LED driver circuit according to claim 7, wherein an output of the LED current detection part has an offset added thereto.

11. An LED driver circuit according to claim 7, wherein an output of the phase angle detection part has an offset added thereto.

12. An LED driver circuit according to claim 1, wherein the second control part comprises:
- a comparator part for comparing a second reference voltage and the detection signal of the LED current detection part;
- another comparator part for comparing a comparison result of the comparison part and a switching current detection signal;
- an oscillator; and
- a latch circuit for outputting a pulsed-control signal based on a comparison result of the another comparator part and an output of the oscillator.

13. An LED driver circuit according to claim 12, wherein the switching current detection signal comprises the detection signal of the switching current detection part.

14. An LED driver circuit according to claim 1, wherein the switching power supply part is constituted by a boost converter or a buck converter.

15. An LED driver circuit according to claim 1, wherein the switching power supply part is constituted by an isolated converter including a transformer.

16. An LED lighting device, comprising:
- an LED driver circuit, to be connected to an AC power supply via a phase-control dimmer, for driving an LED load,
- the LED driver circuit comprising:
  - a switching power supply part including a switching element and a switching current detection part;
  - an LED current detection part;
  - a first control part for controlling and switching the switching element so that a switching current has a desired current value based on a detection signal of the switching current detection part;
  - a second control part for controlling and switching the switching element so that an LED current has a desired current value based on the detection signal of the LED current detection part; and
  - a switch part for switching between control performed by the first control part when the phase-control dimmer is set to high brightness dimming and control performed by the second control part when the phase-control dimmer is set to low brightness dimming; and
- the LED load, which is driven by the LED driver circuit.

* * * * *